(12) United States Patent
Dowden et al.

(10) Patent No.: US 11,066,521 B2
(45) Date of Patent: *Jul. 20, 2021

(54) SILICONE ELASTOMER COMPOSITION

(71) Applicant: TESA SE, Norderstedt (DE)

(72) Inventors: Tom Dowden, Greater London (GB); Jude Pullen, Greater London (GB); Mark Buckingham, Greater London (GB); Priti Ariscrisna, Greater London (GB); Åsa Jerlhagen, Greater London (GB); Reya Shamsah, Greater London (GB); Paraskevi Christogianni, Greater London (GB); Steve Westall, Barry Vale of Glamorgan (GB); Julien Gautrot, Cambridge (GB); Khai Duong Quang Nguyen, Greater London (GB)

(73) Assignee: TESA SE, Norderstedt (DE)

( * ) Notice: Subject to any disclaimer, the term of this patent is extended or adjusted under 35 U.S.C. 154(b) by 92 days.

This patent is subject to a terminal disclaimer.

(21) Appl. No.: 16/469,739

(22) PCT Filed: Jul. 14, 2017

(86) PCT No.: PCT/GB2017/052086
§ 371 (c)(1),
(2) Date: Jun. 14, 2019

(87) PCT Pub. No.: WO2018/109425
PCT Pub. Date: Jun. 21, 2018

(65) Prior Publication Data
US 2020/0148830 A1 May 14, 2020

(30) Foreign Application Priority Data
Dec. 16, 2016 (EP) ..................... 16386022

(51) Int. Cl.
C08G 77/20 (2006.01)
C08K 3/34 (2006.01)
C08L 83/04 (2006.01)

(52) U.S. Cl.
CPC ................ *C08G 77/20* (2013.01); *C08K 3/34* (2013.01); *C08L 83/04* (2013.01); C08L 2205/025 (2013.01)

(58) Field of Classification Search
CPC .......... C08G 77/20; C08K 3/34; C08L 83/04; C08L 2205/025
USPC ........................................................ 524/451
See application file for complete search history.

(56) References Cited

U.S. PATENT DOCUMENTS

| 4,563,498 A * | 1/1986 | Lucas ...................... C08K 5/54 524/788 |
| 6,838,499 B2 * | 1/2005 | Kimura ................... C08L 83/14 524/268 |
| 10,273,335 B2 | 4/2019 | Helpenstein et al. |
| 2017/0081479 A1 | 3/2017 | Helpenstein et al. |

FOREIGN PATENT DOCUMENTS

| DE | 10 2014 212 291 A1 | 12/2015 |
| JP | 2015071459 A * | 4/2015 |
| WO | 2008 065406 A1 | 6/2008 |
| WO | 2011 112699 A1 | 9/2011 |

OTHER PUBLICATIONS

JP 2015-071459 A, machine translation, EPO Espacenet. (Year: 2015).*
International Search Report dated Oct. 10, 2017.

* cited by examiner

*Primary Examiner* — Josephine L Chang
(74) *Attorney, Agent, or Firm* — Norris McLaughlin PA

(57) ABSTRACT

The present invention provides a tin-free, room temperature curable silicone elastomer composition, wherein the uncured composition is a putty.

16 Claims, 1 Drawing Sheet

SILICONE ELASTOMER COMPOSITION

This is an application filed under 35 USC 371 based on PCT/GB2017/052086, which in turn is based on EP 16386022.4 filed 16, Dec. 2016. The present application claims the full priority benefit of these prior applications and herein incorporates by reference the full disclosures of these prior applications.

FIELD OF THE INVENTION

The present invention relates to a tin-free, room temperature curable silicone elastomer composition. The putty-like uncured composition can be moulded into complex shapes and maintains its shape during cure. The silicone elastomer composition of the present invention is useful for a variety of purposes, from forming new objects to customising, repairing or otherwise modifying existing objects.

BACKGROUND

Silicone elastomer compositions that are putty-like in their uncured state and have adhesive properties are known in the art, for example from WO 2008/065406. The putty-like characteristics of the uncured compositions allows them to be moulded to any desired shape, particularly by hand, and to retain that desired shape as they cure at room temperature by simple exposure to moisture in the air. This combination of properties provides an extremely versatile material that has found use in a wide range of applications.

Silicone elastomer compositions of the condensation curing type generally rely on a tin-based curing catalyst, particularly in the case of room temperature curable compositions.

The known compositions of WO 2008/065406 rely on such a tin-based curing catalyst.

While tin-based curing catalysts are very effective and provide compositions suitable for use in many applications, the use of organotin compounds is restricted in certain applications. For example, EU Directive 2009/48/EC on the safety of toys and the associated European Standard EN 71-3:2013+A1:2014 include such restrictions.

Organotin compounds have also been associated with environmental concerns, particularly in relation to the marine environment. As such, it would be desirable to provide a tin-free, room temperature curable silicone elastomer composition that is a putty in its uncured state.

A further consideration in the case of silicone elastomer compositions that are putty-like in their uncured state is their storage characteristics. It is desirable for such compositions to maintain their putty-like characteristics for as long as possible during (moisture-free) storage, thereby providing a long shelf-life. While the known compositions have good properties in this regard, it has been found that they can exhibit an undesirable increase in plasticity after longer periods of storage. As such, it would be desirable to provide a room temperature curable silicone elastomer composition that is a putty in its uncured state and has improved storage characteristics, particularly in terms of plasticity.

In view of the above, there is a need for a room temperature curable silicone elastomer composition that has adhesive properties, is putty-like in its uncured state, is tin-free and is improved with respect to its storage properties.

SUMMARY OF INVENTION

According to a first aspect, the present invention provides a tin-free, room temperature curable silicone elastomer composition, wherein the uncured composition is a putty and comprises the following components:

a) An end-capped base polymer, wherein the base polymer comprises a polysiloxane or mixture of polysiloxanes and has a viscosity of at least 150,000 mPa·s at 25° C., and wherein the end-capped base polymer comprises terminal di-($C_{2-4}$)alkoxy silyl groups;

b) 2 to 20 parts by weight of at least one particulate reinforcing filler for each 100 parts by weight of base polymer;

c) $(85\times(\rho F/2.8))$ to $(135\times(\rho F/2.8))$ parts by weight of at least one particulate non-reinforcing filler for each 100 parts by weight of base polymer, wherein $\rho F$ is the mean true density (g/cm$^3$) of the at least one particulate non-reinforcing filler; and d) A curing catalyst consisting of one or more selected from the group consisting of organic titanates and organic zirconates.

The Williams plasticity of the uncured composition may be from 100 to 350 at 25° C., for example from 100 to 300 at 25° C., for example from 100 to 250 at 25° C., for example from 120 to 200 at 25° C. or from 120 to 170 at 25° C.

The composition is advantageously a one-part silicone elastomer composition.

The base polymer may comprise one type or more than one type of monomer of the following general formula:

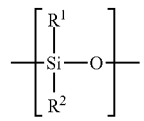

wherein $R^1$ and $R^2$ are independently selected from the group consisting of linear or branched ($C_{1-6}$)alkyl groups, linear or branched ($C_{2-6}$)alkenyl groups, linear or branched ($C_{2-4}$)haloalkyl groups and phenyl groups. For example, $R^1$ and $R^2$ may be independently selected from the group consisting of linear or branched ($C_{1-6}$)alkyl groups and ($C_{2-3}$)alkylene-trihalomethyl groups; for example independently selected from the group consisting of linear or branched ($C_{1-2}$)alkyl groups, ($C_{2-3}$)alkylene-trifluoromethyl groups, and ($C_{2-3}$)alkylene-trichloromethyl groups; for example independently selected from the group consisting of a methyl group, an ethyl group, a 3,3,3-trifluoropropyl group and a 4,4,4-trifluorobutyl group.

Both $R^1$ and $R^2$ may be methyl groups. In particular, at least 75% of the $R^1$ and $R^2$ groups of the base polymer may be methyl groups; at least 90% of the $R^1$ and $R^2$ groups of the base polymer may be methyl groups; or all of the $R^1$ and $R^2$ groups of the base polymer may be methyl groups.

The base polymer may comprise a hydroxy-terminated polysiloxane or mixture of hydroxy-terminated polysiloxanes. The hydroxy-terminated polysiloxane, or each hydroxy-terminated polysiloxane in the mixture of hydroxy-terminated polysiloxanes, may have the following general formula:

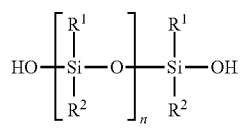

wherein n is selected such that the hydroxy-terminated polysiloxane or mixture of hydroxy-terminated polysiloxanes has a viscosity of at least 150,000 mPa·s at 25° C.

The base polymer may comprise a hydroxy-terminated polydimethylsiloxane (PDMS) or mixture of hydroxy-terminated polydimethylsiloxanes.

The viscosity of the base polymer may be from 150,000 to 1,000,000 mPa·s at 25° C., for example from 150,000 to 700,000 mPa·s at 25° C., from 250,000 to 600,000 mPa·s at 25° C., from 300,000 to 550,000 mPa·s at 25° C., from 320,000 to 500,000 mPa·s at 25° C. or from 350,000 to 500,000 mPa·s at 25° C.

The terminal di-($C_{2-4}$)alkoxy silyl groups may have the general formula:

wherein $R^a$ is selected from the group consisting of a linear or branched ($C_{1-10}$)alkyl group, a linear or branched ($C_{2-8}$)alkenyl group and a ($C_{6-10}$)aryl group, each of which groups may be optionally substituted by one or more substituents selected from the group consisting of halogens, a cyano group, an aminyl group, an —$NHR^e$, group, an —$NR^eR^f$ group, an —$OR^e$ group, a —$C(=O)R^e$ group, a —$C(=O)OR^e$ group, a carboxyl group, a glycidyl group and a sulfanyl group, wherein each $R^e$ and $R^f$ group is independently selected from the group consisting of linear or branched ($C_{1-6}$)alkyl groups; and $R^b$ and $R^c$ are independently selected from the group consisting of ($C_{2-4}$)alkyl groups.

$R^a$ may, for example, be selected from the group consisting of a linear or branched ($C_{1-6}$)alkyl group and a linear or branched ($C_{2-6}$)alkenyl group, for example from the group consisting of a ($C_{1-2}$)alkyl group or a ($C_{2-3}$)alkenyl group, for example from the group consisting of a methyl group and a vinyl group.

$R^b$ and $R^c$ may, for example, be independently selected from the group consisting of ethyl, n-propyl and iso-propyl groups. For example, $R^b$ and $R^c$ may be ethyl groups.

The end-capped base polymer may be the reaction product of a hydroxy-terminated polysiloxane or mixture of hydroxy-terminated polysiloxanes and an end-capping reagent comprising a tri-($C_{2-4}$)alkoxy silane. The tri-($C_{2-4}$)alkoxy silane may have the general formula:

$$SiR^a(OR^b)(OR^c)(OR^d)$$

wherein $R^a$, $R^b$ and $R^c$ are as defined above; and $R^d$ is a ($C_{2-4}$)alkyl group. For example, $R^d$ may be selected from the group consisting of ethyl, n-propyl and iso-propyl groups.

For example, $R^d$ may be an ethyl group.

The tri-($C_{2-4}$)alkoxy silane may, for example, be selected from the group consisting of triethoxyvinylsilane, triethoxymethyl silane, and mixtures thereof.

The organic titanates and organic zirconates may be represented by the following general formula:

$$M(OR)_a(C)_{4-a}$$

wherein M is Ti or Zr; each R may be the same or different and represents a linear or branched ($C_{1-12}$)alkyl group; each C may be the same or different and represents a ligand having the following general formula:

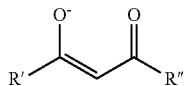

wherein R' and R" are independently selected from the group consisting of a linear or branched ($C_{1-6}$)alkyl group and a linear or branched ($C_{1-6}$)alkoxy group; and a is an integer from 0 to 4.

M may, for example, be Ti. Each R may, for example, be the same or different and represent a linear or branched ($C_{3-10}$)alkyl group, for example a linear or branched ($C_{3-8}$) alkyl group, for example an isobutyl, isopropyl or 2-ethyl hexyl group. R' and R" may, for example, be independently selected from the group consisting of a linear or branched ($C_{1-3}$)alkyl group and a linear or branched ($C_{1-3}$)alkoxy group, for example from the group consisting of a methyl group, an ethyl group, a methoxy group and an ethoxy group, for example from the group consisting of a methyl group and an ethoxy group.

For example, R' may be a linear or branched ($C_{1-3}$)alkyl group and R" may be a linear or branched ($C_{1-3}$)alkoxy group. For example, R' may be a methyl or ethyl group and R" may be a methoxy or ethoxy group.

a may be 0, 2 or 4. For example, a may be 2.

The curing catalyst may consists of one or more selected from the group consisting of diisobutoxy-bis(ethylacetoacetato)titanate, titanium diisobutoxide bis(acetylacetonate), titanium diisopropoxide bis(acetylacetonate), titanium diisopropoxide bis(ethylacetoacetate) and zirconium dibutoxide bis(acetylacetonate).

The at least one particulate reinforcing filler may have a B.E.T. surface area of at least 60 $m^2/g$, for example from 60 $m^2/g$ to 450 $m^2/g$, for example from 80 $m^2/g$ to 150 $m^2/g$.

The at least one particulate reinforcing filler may be selected from the group consisting of fumed silica, fumed alumina, carbon black, precipitated silica, precipitated calcium carbonate, cobalt dioxide, titanium dioxide and mixtures thereof. For example, the at least one particulate reinforcing filler may be fumed silica, for example hydrophobic fumed silica.

The at least one particulate non-reinforcing filler may have an average particle size (D50) of at least 5 μm, for example from 5 μm to 35 μm. The B.E.T. surface area of the at least one particulate non-reinforcing filler may be less than 40 $m^2/g$.

The at least one particulate non-reinforcing filler may be selected from the group consisting of talc, calcium carbonate, calcium silicate, mica, barium sulfate, precipitated silica, and mixtures thereof. For example, the at least one particulate non-reinforcing filler may comprise one or more grades of talc, for example one or more grades of talc selected from the group consisting of talc grades having an average particle size (D50) in the range of from 5 to 35 μm.

The at least one particulate non-reinforcing filler may comprise at least one filler having a needle-like structure. The at least one filler having a needle-like structure may have an average particle length (L50) of at least 5 μm, for example from 5 μm to 90 μm or from 10 μm to 30 μm.

The at least one filler having a needle-like structure may have a mean aspect ratio of at least 3, for example from 3 to 30 or from 3 to 20.

The at least one filler having a needle-like structure may be an inorganic mineral filler and may be selected, for example, from wollastonite, aluminium borate, and mixtures thereof. For example, the at least one filler having a needle like structure may comprise wollastonite.

The at least one filler having a needle-like structure may be present in an amount of from 25% to 75% by weight based on the total weight of the at least one particulate non-reinforcing filler, for example from 30% to 70% by weight based on the total weight of the at least one particulate non-reinforcing filler.

The at least one particulate non-reinforcing filler may be a combination of at least one granular non-reinforcing filler having an average particle size (D50) of at least 5 μm and at least one filler having a needle-like structure. For example, the at least one particulate non-reinforcing filler may be a combination of at least one particulate non-reinforcing filler selected from the group consisting of talc, calcium carbonate, calcium silicate, mica, barium sulfate, precipitated silica, and mixtures thereof and at least one filler having a needle-like structure. For example, the at least one particulate non-reinforcing filler may be a combination of one or more grades of talc and at least one filler having a needle-like structure. In each case, the at least one filler having a needle-like structure may be wollastonite.

The composition may additionally comprise at least one tack reducing additive selected from the group consisting of microcellular particulate materials. The at least one tack-reducing additive may be included in the composition is an amount of from 5 to 15 parts by weight for each 100 parts by weight of the base polymer. The microcellular particulate material may comprise hollow particles, microspheres and/or microballoons of a glass; may have an average particle size (D50) in the range of from 30 to 50 μm; and/or may have a mean true density in the range of from 0.15 to 0.35 g/cm$^3$.

The composition may comprise from 10 to 20 parts by weight of the at least one particulate reinforcing filler for each 100 parts by weight of base polymer, for example from 12 to 18 parts of the at least one particulate reinforcing filler for each 100 parts by weight of base polymer.

The mean true density of the at least one particulate non-reinforcing filler may be from 1.5 to 5 g/cm$^3$.

The composition may comprise from 85 to 135 parts by weight of the at least one particulate non-reinforcing filler for each 100 parts by weight of base polymer, for example from 100 to 125 parts by weight of the at least one particulate non-reinforcing filler for each 100 parts by weight of base polymer.

The composition may additionally comprise an adhesion promoter, for example up to 2 parts by weight of adhesion promoter for each 100 parts by weight of base polymer. The adhesion promoter may, for example, be one or more selected from the group of compounds having the following general formula:

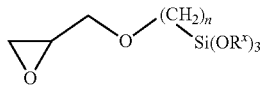

wherein n is an integer from 2 to 10; and R$^x$ is a linear or branched (C$_{1-6}$)alkyl group. For example, n may be 3 or 8 and R$^x$ may be an ethyl group.

The composition may further comprise at least one stabiliser. The at least one stabiliser may be a tri-(C$_{2-4}$)alkoxy silane as defined above with reference to the end-capping reagent. The composition may comprise from 1.5 to 3.5 parts by weight of the at least one stabiliser for each 100 parts by weight of base polymer.

The composition may further comprise at least one fibrous filler. The at least one fibrous filler may be composed of threads or filaments having an average aspect ratio of greater than 10 and an average length of less than 1 mm. For example, the average length of the threads or filaments may be from 75 μm to 500 μm.

The at least one fibrous filler may be selected from the group consisting of natural and synthetic organic polymers. For example, the at least one fibrous filler may comprise chopped fibres of one or more selected from the group consisting of natural and synthetic organic polymers.

The composition may comprise up to 15 parts, for example up to 13 parts or up to 11 parts, by weight of the at least one fibrous filler for each 100 parts by weight of base polymer.

The composition may further comprise one or more additives selected from the group consisting of colourants, fragrances, anti-microbial agents, anti-bacterial agents and anti-fungal agents.

The composition preferably comprises less than 10 parts by weight of silicone elastomer powder for each 100 parts by weight of base polymer and more preferably does not contain any silicone elastomer powder.

Preferably, no carboxylic acid or carboxylic acid anhydride is added to the composition.

According to a further aspect, the present invention provides a silicone elastomer composition comprising the composition described above in its cured state.

DETAILED DESCRIPTION

Figure 1:
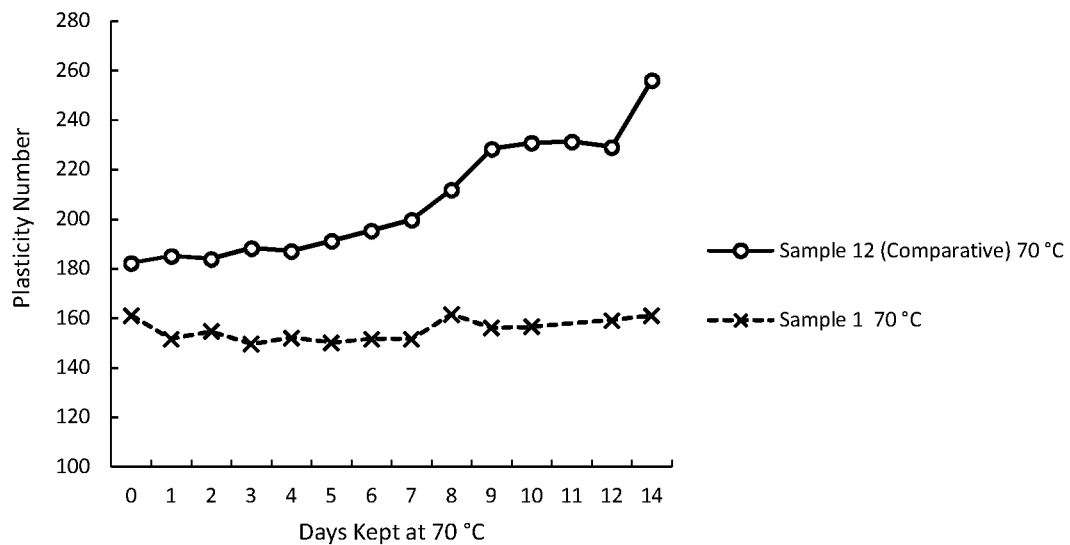
FIG. 1 shows the results of an accelerated aging test at 70° C. for Sample 1 (of Example 1) and Sample 12 (Comparative)

According to a first aspect, the present invention provides a tin-free, room temperature curable silicone elastomer composition, wherein the uncured composition is a putty and comprises the following components:
  a) An end-capped base polymer, wherein the base polymer comprises a polysiloxane or mixture of polysiloxanes and has a viscosity of at least 150,000 mPa·s at 25° C., and wherein the end-capped base polymer comprises terminal di-(C$_{2-4}$)alkoxy silyl groups;
  b) 2 to 20 parts by weight of at least one particulate reinforcing filler for each 100 parts by weight of base polymer;
  c) (85×(ρF/2.8)) to (135×(ρF/2.8)) parts by weight of at least one particulate non-reinforcing filler for each 100 parts by weight of base polymer, wherein ρF is the mean true density (g/cm$^3$) of the at least one particulate non-reinforcing filler; and
  d) A curing catalyst consisting of one or more selected from the group consisting of organic titanates and organic zirconates.

Unless otherwise stated herein, all physical characteristics refer to characteristics under ambient conditions, for example at 25° C. and atmospheric pressure.

The composition of the present invention offers a number of advantages compared to known room temperature curable silicone elastomer compositions that are putty-like in their uncured state. In particular, the composition of the present invention does not contain any tin and has improved storage characteristics, particularly in terms of maintaining its plasticity at a desired level during (moisture-free) storage.

The composition of the present invention is tin-free. In other words, the composition does not contain any tin in any form. In particular, the composition does not contain any tin-based catalysts. More particularly, the composition does not contain any organic tin compounds.

The provision of a tin-free composition has a number of advantages. One advantage is that tin-free compositions are preferable from a regulatory perspective, particularly for certain applications (see, for example, EU Directive 2009/48/EC on the safety of toys and the associated European Standard EN 71-3:2013+A1:2014). A further advantage is that the absence of tin, particularly organic tin compounds, may provide benefits from an environmental perspective.

The composition of the present invention is room temperature curable. This means that the composition is able to be cured in air under ambient conditions, for example at a temperature of 25° C.

The composition of the present invention is of the moisture-curing type (condensation curing). This means that moisture is required in order for the composition to cure. The moisture required for cure is typically provided by the moisture naturally present in the air.

The composition of the present invention is a putty in its uncured state, i.e. it has putty-like physical characteristics. The putty-like characteristics of the uncured composition may be characterised by its Williams plasticity.

Williams plasticity is a well-known methodology for characterising the plasticity of putty-like materials. A method for determining Williams plasticity is set out in the Examples.

The Williams plasticity of the uncured composition may advantageously be in the range of from 100 to 350 at 25° C. For example, the Williams plasticity of the uncured composition may be 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345 or 350 at 25° C., as well as all intermediate values. Preferred Williams plasticity ranges for the uncured composition include 100 to 300 at 25° C., 100 to 250 at 25° C., 120 to 215 at 25° C., 120 to 200 at 25° C., 120 to 170 at 25° C. and 130 to 160 at 25° C. Other preferred Williams plasticity ranges for the uncured composition include 160 to 350 at 25° C., 190 to 310 at 25° C. and 220 to 280 at 25° C.

The putty-like characteristics of the uncured composition of the present invention allow the uncured composition to be moulded into any desired shape, for example by hand (i.e., the uncured composition of the present invention is preferably hand-mouldable).

The uncured composition of the present invention is advantageously "low tack", particularly with respect to human skin. As such, when the uncured composition of the present invention is being moulded by hand, the composition does not stick to the skin to any significant extent and does not leave any significant residue. This provides for a pleasant and convenient user experience. In particular, the low tack characteristics of the composition enable it to be readily formed into precise shapes with smooth surfaces, for example by hand.

In addition to being readily mouldable, particularly hand-mouldable, an advantage of the uncured composition of the present invention is that it retains its shape once moulded and during subsequent cure, i.e. the uncured composition has excellent green strength (i.e. is self-supporting).

Curable silicone elastomer compositions are very common in the sealant and filler industries. In this regard, it should be noted that the physical characteristics and requirements of silicone sealants and fillers are very different to the physical characteristics and requirements of the compositions of the present invention. In particular, silicone sealants and fillers are designed to flow and fill gaps, while a putty-like composition is designed to maintain the shape into which it has been moulded. Thus, typically, silicone sealant and filler compositions are required to be easily extrudable in their uncured state (for example from a sealant gun), i.e. they are not putty-like and, to the extent that it can even be measured, they have very low plasticity; they are not low-tack, are not intended to be touched by hand, and leave significant residue on the skin if touched by hand; they cannot be moulded into complex shapes; and they have comparatively low green strength (i.e. are not self-supporting, particularly in the case of complex shapes and areas of overhang).

The composition of the present invention is preferably a one-part composition. This means that all components of the composition are pre-mixed during production, so that the composition is ready for use by an end user. However, it is conceivable that the composition of the present invention could also be supplied in two parts, if required.

The composition according to the present invention comprises an end-capped base polymer. The base polymer comprises a polysiloxane or mixture of polysiloxanes and has a viscosity of at least 150,000 mPa·s at 25° C. The end-capped base polymer comprises terminal di-($C_{2-4}$) alkoxy silyl groups.

The base polymer preferably comprises a polyorganosiloxane or mixture of polyorganosiloxanes. Preferably, the base polymer comprises one type or more than one type of monomer of the following general formula:

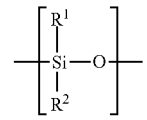

wherein $R^1$ and $R^2$ are independently selected from the group consisting of linear or branched ($C_{1-6}$)alkyl groups, linear or branched ($C_{2-6}$)alkenyl groups, linear or branched ($C_{2-4}$)haloalkyl groups and phenyl groups.

In the case of a mixture of polysiloxanes, it is preferred that each polysiloxane in the mixture comprises one type or more than one type of monomer as defined above and as further defined below.

It is preferred that at least 75% of the monomers present in the base polymer are monomers as defined above and as further defined below, for example at least 80%, at least 85%, at least 90%, or at least 95%. Advantageously, substantially all of the monomers present in the base polymer are monomers as defined above and as further defined below.

Preferred groups for $R^1$ and $R^2$ are independently selected from the group consisting of linear or branched ($C_{1-6}$)alkyl groups and ($C_{2-3}$)alkylene-trihalomethyl groups (i.e. ($CH_2$)$_{2-3}CX_3$ groups, wherein X is a halogen; preferably, each X is independently selected from the group consisting of fluoro and chloro). Further preferred groups for $R^1$ and $R^2$ are independently selected from the group consisting of linear or branched ($C_{1-2}$)alkyl groups, ($C_{2-3}$)alkylene-trifluoromethyl groups, and ($C_{2-3}$)alkylene-trichloromethyl groups. In particular, $R^1$ and $R^2$ may be independently selected from the group consisting of a methyl group, an ethyl group, a 3,3,3-trifluoropropyl group and a 4,4,4-trifluorobutyl group.

Particularly preferred base polymers of the present invention comprise monomers in which both $R^1$ and $R^2$ are methyl groups. For example, at least 75% of the monomers present in the base polymer can be monomers in which both $R^1$ and $R^2$ are methyl groups, for example at least 80%, at least 85%, at least 90%, or at least 95%.

Advantageously, substantially all of the monomers present in the base polymer are monomers in which both $R^1$ and $R^2$ are methyl groups.

In the case where substantially all of the monomer units present in the base polymer are monomers in which both $R^1$ and $R^2$ are methyl group, the base polymer is a polydimethylsiloxane (PDMS) or mixture of polydimethylsiloxanes.

Polydimethylsiloxanes are a very practical choice for use in the present invention, due not only to their advantageous properties, but also on account of their low cost and wide availability.

It is preferred that the polysiloxane of the base polymer or mixture of polysiloxanes of the base polymer are substantially linear.

The base polymer may comprise a hydroxy-terminated polysiloxane (i.e. an α,ω-hydroxy polysiloxane) or mixture of hydroxy-terminated polysiloxanes. The terminal group of such hydroxy-terminated polysiloxanes may have the following general formula:

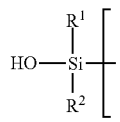

wherein $R^1$ and $R^2$ are as defined above.

Where the base polymer comprises a hydroxy-terminated polysiloxane or mixture of hydroxy-terminated polysiloxanes in which all of the monomer units present in the base polymer are monomer units of the type described above, then the hydroxy-terminated polysiloxane or each hydroxy-terminated polysiloxane in a mixture of hydroxy-terminated polysiloxanes may have the following general formula:

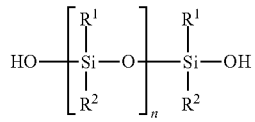

wherein n is selected such that the hydroxy-terminated polysiloxane or mixture of hydroxy-terminated polysiloxanes has a viscosity of at least 150,000 mPa·s at 25° C. The average value of n may be, for example, from at least 1550.

The average value of n may be, for example, at least 1550, at least 1580, at least 1600, at least 1615, at least 1635, at least 1650, at least 1670, at least 1685, at least 1700, at least 1715, at least 1730, at least 1740, at least 1755, at least 1765, at least 1780, at least 1790, at least 1800, at least 1815, at least 1825, at least 1835, or at least 1845.

The average value of n may be, for example, up to 2235, up to 2190, up to 2145, up to 2095, up to 2070, up to 2040, up to 2035, up to 2025, up to 2020, up to 2015, up to 2005, up to 2000, up to 1995, up to 1985, up to 1980, or up to 1970.

The average value of n may be, for example, from 1550 to 2235, from 1550 to 2095, from 1730 to 2040, from 1790 to 2005, or from 1845 to 1970.

A preferred base polymer according to the present invention comprises a hydroxy-terminated polydimethylsiloxane (PDMS) or mixture of hydroxy-terminated polydimethylsiloxanes.

The viscosity of the base polymer is at least 150,000 mPa·s at 25° C., for example at least 160,000, at least 170,000, at least 180,000, at least 190,000, at least 200,000, at least 210,000, at least 220,000, at least 230,000, at least 240,000, at least 250,000, at least 260,000, at least 270,000, at least 280,000, at least 290,000, at least 300,000, at least 310,000, at least 320,000, at least 330,000, at least 340,000 or at least 350,000 mPa·s at 25° C.

The viscosity of the base polymer is preferably not more than 1,000,000 mPa·s at 25° C., for example not more than 900,000, not more than 800,000, not more than 700,000, not more than 650,000, not more than 600,000, not more than 590,000, not more than 580,000, not more than 570,000, not more than 560,000, not more than 550,000, not more than 540,000, not more than 530,000, not more than 520,000, not more than 510,000, or not more than 500,000 mPa·s at 25° C.

The viscosity of the base polymer is preferably from 150,000 to 1,000,000 mPa·s at 25° C., for example from 150,000 to 700,000, from 250,000 to 600,000, from 300,000 to 550,000, from 320,000 to 500,000 or from 350,000 to 500,000 mPa·s at 25° C., including all intermediate values.

The end-capped base polymer of the present invention comprises terminal di-$(C_{2-4})$alkoxy silyl groups. The terminal di-$(C_{2-4})$alkoxy silyl groups may have the following general formula:

wherein:

$R^a$ is selected from the group consisting of a linear or branched $(C_{1-10})$alkyl group, a linear or branched $(C_{2-8})$alkenyl group and a $(C_{6-10})$aryl group, each of which groups may be optionally substituted by one or more substituents selected from the group consisting of halogens (for example, fluoro and/or chloro, particularly fluoro), a cyano group, an aminyl group, an —$NHR^e$, group, an —$NR^eR^f$ group, an —$OR^e$ group, a —$C(=O)R^e$ group, a —$C(=O)OR^e$ group, a carboxyl group, a glycidyl group and a sulfanyl group, wherein each $R^e$ and $R^f$ group is independently selected from the group consisting of linear or branched $(C_{1-6})$alkyl groups; and $R^b$ and $R^c$ are independently selected from the group consisting of $(C_{2-4})$alkyl groups.

Preferred groups for $R^a$ include those selected from the group consisting of a linear or branched $(C_{1-6})$alkyl group and a linear or branched $(C_{2-6})$alkenyl group, particularly a $(C_{1-2})$alkyl group or a $(C_{2-3})$alkenyl group, and more particularly a methyl group or a vinyl group. Preferably, $R^a$ is not substituted.

In the case where $R^a$ is a $(C_{6-10})$aryl group, preferred groups include phenyl and naphthyl groups.

In the case where $R^a$ is substituted, example groups include fluoro-substituted linear or branched $(C_{1-6})$alkyl groups, for example trifluoropropyl groups; cyano-substituted linear or branched $(C_{1-6})$alkyl groups, for example cyanopropyl groups; and amino-substituted linear or branched $(C_{1-6})$alkyl groups, for example aminopropyl groups.

Preferred groups for $R^b$ and $R^c$ include those independently selected from the group consisting of ethyl, n-propyl and iso-propyl groups. Advantageously, both $R^b$ and $R^c$ are ethyl groups.

It is preferred that at least 50% of the terminal groups present in the base polymer be end-capped by a di-($C_{2-4}$) alkoxy silyl group in the end-capped base polymer, more preferably at least 75%, at least 80%, at least 85%, at least 90%, or at least 95%.

Advantageously, substantially all of the terminal groups present in the base polymer are end capped by a di-($C_{2-4}$) alkoxy silyl group in the end-capped base polymer.

Where the base polymer is a hydroxy-terminated polysiloxane or mixture of hydroxy-terminated polysiloxanes, then the end-capped base polymer is advantageously the reaction product of the hydroxy-terminated polysiloxane or mixture of hydroxy-terminated polysiloxanes and an end-capping reagent comprising a tri-($C_{2-4}$)alkoxy silane.

The tri-($C_{2-4}$)alkoxy silane for use as an end-capping reagent (crosslinker) may have the following general formula:

$$SiR^a(OR^b)(OR^c)(OR^d)$$

wherein:

$R^a$, $R^b$ and $R^c$ are as defined previously; and $R^d$ is a $C_{(2-4)}$alkyl group.

In the same way as for $R^b$ and $R^c$, preferred groups for $R^d$ are selected from the group consisting of ethyl, n-propyl and iso-propyl groups. Advantageously, all of $R^b$, $R^c$ and $R^d$ are ethyl groups.

Preferred examples of the tri-($C_{2-4}$)alkoxy silane are selected from the group consisting of triethoxyvinylsilane, triethoxymethyl silane, and mixtures thereof.

The end-capping reagent (crosslinker) preferably comprises at least 50% of tri-($C_{2-4}$)alkoxy silane, more preferably at least 75%, at least 80%, at least 85%, at least 90%, or at least 95%. Alternatively, the end-capping reagent (crosslinker) may consist of tri-($C_{2-4}$)alkoxy silane.

The amount of end-capping reagent used is preferably from 1.5 to 3.5 parts by weight for each 100 parts by weight of base polymer, for example 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4 or 3.5 parts by weight for each 100 parts by weight of base polymer.

The composition of the present invention comprises a curing catalyst consisting of one or more selected from the group consisting of organic titanates and organic zirconates. No other curing catalyst is required in the composition.

The organic titanates and organic zirconates for use as curing catalyst in the present invention may be selected from the group of organic titanates and organic zirconates represented by the following general formula:

$$M(OR)_a(C)_{4-a}$$

wherein:

M is Ti or Zr;

each R may be the same or different and represents a linear or branched $C_{(1-12)}$alkyl group;

each C may be the same or different and represents a ligand having the following general formula:

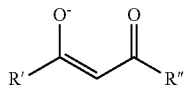

wherein R' and R" are independently selected from the group consisting of a linear or branched ($C_{1-6}$)alkyl group and a linear or branched ($C_{1-6}$)alkoxy group; and a is an integer from 0 to 4.

Preferred curing catalysts for use in the present invention are organic titanates, such as catalysts of the above general formula in which M is Ti.

Each R group of the curing catalyst may, for example, be the same or different and selected from the group consisting of linear or branched ($C_{3-10}$)alkyl groups, particularly ($C_{3-8}$)alkyl groups. Examples include isobutyl, isopropyl and 2-ethyl hexyl groups.

Preferred groups for R' and R" include those independently selected from the group consisting of a linear or branched ($C_{1-3}$)alkyl group and a linear or branched ($C_{1-3}$) alkoxy group. Examples include a methyl group, an ethyl group, a methoxy group and an ethoxy group, and methyl and ethoxy groups are examples of preferred groups.

Examples of curing catalysts for use in the present invention are those according to the above general formula in which a is 0, 2 or 4. Examples of preferred curing catalysts are those according to the above general formula in which a is 2.

Examples of specific curing catalysts that may be contemplated for use in the present invention are those selected from the group consisting of diisobutoxy-bis(ethylacetoacetato)titanate (CAS: 83877-91-2), titanium diisobutoxide bis(acetylacetonate) (CAS: 17927-72-9), titanium diisopropoxide bis(acetylacetonate), titanium diisopropoxide bis (ethylacetoacetate) (CAS: 27858-32-8), zirconium dibutoxide bis(acetylacetonate) and mixtures thereof.

The curing catalyst may be used in an amount of from 1 to 3.5 parts by weight for each 100 parts by weight of base polymer, for example 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4 or 3.5 parts by weight for each 100 parts by weight of base polymer.

The composition of the present invention comprises at least one particulate reinforcing filler.

The particulate reinforcing filler for use in the composition of the present invention preferably has a high surface area, for example a B.E.T. surface area of at least 60 $m^2/g$, for example at least 65 $m^2/g$, at least 70 $m^2/g$, at least 75 $m^2/g$, at least 80 $m^2/g$, at least 85 $m^2/g$, at least 90 $m^2/g$, at least 95 $m^2/g$ or at least 100 $m^2/g$. The particulate reinforcing filler may have a B.E.T. surface are of up to 450 $m^2/g$, for example up to 400 $m^2/g$, up to 350 $m^2/g$, up to 300 $m^2/g$, up to 250 $m^2/g$, up to 200 $m^2/g$, up to 175 $m^2/g$ or up to 150 $m^2/g$.

Example particulate reinforcing fillers for use in the present invention may have a B.E.T. surface are of from 60 to 450 $m^2/g$, for example from 80 to 150 $m^2/g$, including all intermediate values.

Particulate reinforcing fillers that may be contemplated for use in the present invention include those selected from the group consisting of fumed silica, fumed alumina, carbon black, precipitated silica, precipitated calcium carbonate, cobalt dioxide, titanium dioxide and mixtures thereof. Fumed silica is particularly preferred.

The particulate reinforcing filler for use in the composition of the present invention may be surface treated. For example, the particulate reinforcing filler may be surface treated to make it hydrophobic. Such surface treated particulate reinforcing fillers are well known in the art and commercially available.

Hydrophobic fumed silica is particularly suitable for use in the composition of the present invention, for example silica that has been treated with, for example, a dimethyl silicone fluid (i.e. dimethylsiloxane), dichlorodimethylsilane, hexamethyldisilazane, octamethylcyclopolysiloxane (e.g. octamethylcyclotetrasiloxane) or the like.

The amount of particulate reinforcing filler in the composition according to the present invention is from 2 to 20 parts by weight for each 100 parts by weight of base polymer, for example 2 parts, 3 parts, 4 parts, 5 parts, 6 parts, 7 parts, 8 parts, 9 parts, 10 parts, 11 parts, 12 parts, 13 parts, 14 parts, 15 parts, 16 parts, 17 parts, 18 parts, 19 parts, or 20 parts by weight for each 100 parts by weight of base polymer, as well as all intermediate values. For example, the composition may comprise from 10 to 20 parts by weight or from 12 to 18 parts by weight of the particulate reinforcing filler for each 100 parts by weight of base polymer.

The composition of the present invention also includes at least one particulate non-reinforcing filler. Non-reinforcing fillers are also known as "extending" fillers.

The at least one particulate non-reinforcing filler for use in the composition of the present invention preferably has an average particle size (D50) of at least 5 μm, for example from 5 μm to 35 μm (wherein D50 is the particle size at which 50% by volume of the total volume of particles has a smaller particle size and 50% by volume of the total volume of particles has a larger particle size, measured, for example, by sieving).

The B.E.T. surface area of the at least one particulate non-reinforcing filler is preferably less than 40 m$^2$/g, for example less than 35 m$^2$/g, less than 30 m$^2$/g, less than 25 m$^2$/g, less than 20 m$^2$/g or less than 15 m$^2$/g.

Examples of particulate non-reinforcing fillers that may be contemplated for use in the compositions according to the present invention include one or more selected from the group consisting of calcium carbonate (such as dry ground grades of calcium carbonate, wet ground grades of calcium carbonate, beneficiated grades of calcium carbonate, precipitated grades of calcium carbonate, surface treated grades of calcium carbonate); kaolin and other clay-based minerals (such as water fractionated clays, air floated clays, delaminated clays, calcined clays, surface treated clays, bentonite, slate flour, dolomite); talc (such as dry ground talc, beneficiated ground talc, calcined talc, surface-treated talc); quartz and silica, including natural silicas (such as fused silica, microcrystalline silica, microcrystalline novaculite, diatomaceous silica, perlite) or synthetic silicas (such as fumed silica, precipitated silicas); mica (including ground grades of mica, white grades of mica, surface-modified grades of mica, metal-coated mica grades, vermiculite); pumice; metal oxides and other compounds (such as titanium dioxide, iron oxide, alumina trihydrate, wollastonite, barium sulfate, barium titanate, antimony oxide, magnesium hydroxide, calcium sulfate, anhydrous calcium sulfate, dihydrate calcium sulfate, feldspar, nepheline syenite, zinc oxide); synthetic silicates (such as aluminium silicate, mullite, sillimanite, cyanite, andalusite, synthetic alkali metal aluminosilicates, calcium silicate, magnesium silicate, zirconium silicate); pyrophyllite, sepiolite, zeolites, zinc sulphide, boron nitride, aluminium borate whiskers, graphite; organic fillers (such as cork fillers, corn cob fillers, nutshell flour fillers, rice hull fillers, soybean fillers, starch fillers, wheat flour, wood flour); glass, metals (such as nickel, cobalt) and any non-elastomeric solid polymer.

Preferred fillers for use as the at least one particulate non-reinforcing filler in the composition according to the present invention include those selected from the group consisting of talc, calcium carbonate, calcium silicate, mica, barium sulfate, precipitated silica, and mixtures thereof.

Advantageously, the at least one particulate non-reinforcing filler for use in the compositions according to the present invention comprises one or more grades of talc.

The one or more grades of talc may be selected from talc grades having an average particle size (D50) in the range of from 5 to 35 μm.

The at least one particulate non-reinforcing filler may advantageously comprise at least one filler having a needle-like structure, i.e. comprising needle-like particles. The at least one filler having a needle-like structure is preferably characterised by an average particle length (L50) of at least 5 μm (wherein L50 is the particle length at which 50% by volume of the total volume of particles has a shorter particle length and 50% by volume of the total volume of particles has a longer particle length, measured by image analysis) and a mean aspect ratio (i.e. ratio of length to diameter) of at least 3.

The average particle length (L50) of the at least one filler having a needle-like structure is preferably at least 5 μm, for example from 5 μm to 90 μm, for example 5, 10, 15, 20, 25, 30, 35, 40, 45, 50, 55, 60, 65, 70, 75, 80, 85 or 90 μm, including all intermediate values. Preferably, the average particle length (L50) of the at least one filler having a needle-like structure is from 10 μm to 30 μm, for example 10, 11, 12, 13, 14, 15, 16, 17, 18, 19, 20, 21, 22, 23, 24, 25, 26, 27, 28, 29 or 30 μm.

The mean aspect ratio of the at least one filler having a needle-like structure is preferably at least 3, for example from 3 to 30, for example 3, 6, 9, 12, 15, 18, 21, 24, 27 or 30, including all intermediate values. Preferably, the mean aspect ratio of the at least one filler having a needle-like structure is from 3 to 20, for example 3, 4, 5, 6, 7, 8, 9, 10, 11, 12, 13, 14, 15, 16, 17, 18, 19 or 20. The mean aspect ratio may be, for example, from 4 to 15.

The at least one filler having a needle like structure is preferably an inorganic mineral filler. Preferred examples include wollastonite, aluminium borate and mixtures thereof.

When the at least one particulate non-reinforcing filler comprises at least one filler having a needle-like structure, it is preferred that the at least one filler having a needle-like structure be present in an amount of from about 25% to about 75% by weight based on the total weight of the at least one particulate non-reinforcing filler, for example 25, 30, 35, 40, 45, 50, 55, 60, 65, 70 or 75% by weight based on the total weight of the at least one particulate non-reinforcing filler, including all intermediate values. Preferably, the at least one filler having a needle-like structure is present in an amount of from about 30% to about 70% by weight based on the total weight of the at least one particulate non-reinforcing filler.

Advantageously, the at least one particulate non-reinforcing filler may be a combination of at least one granular non-reinforcing filler having an average particle size (D50) of at least 5 μm (for example from 5 to 35 μm) and at least one filler having a needle-like structure, for example wollastonite. For example, the at least one particulate non-reinforcing filler may comprise at least one granular non-reinforcing filler having an average particle size (D50) of at least 5 μm (for example from 5 to 35 μm) in an amount of from about 25% to about 75% (for example, from about 30% to about 70%) by weight, and at least one filler having a needle-like structure (for example wollastonite) in an amount of from about 75% to about 25% (for example, from about 70% to about 30%) by weight, based on the total weight of the at least one particulate non-reinforcing filler.

Advantageously, the at least one particulate non-reinforcing filler may be a combination of at least one particulate non-reinforcing filler selected from the group consisting of talc, calcium carbonate, calcium silicate, mica, barium sulfate, precipitated silica, and mixtures thereof (and having, for example, an average particle size (D50) of at least 5 μm, for example in the range of from 5 to 35 μm) and at least one filler having a needle-like structure, for example wollastonite. For example, the at least one particulate non-reinforcing filler may comprise at least one particulate non-reinforcing filler selected from the group consisting of talc, calcium carbonate, calcium silicate, mica, barium sulfate, precipitated silica, and mixtures thereof (and having, for example, an average particle size (D50) in the range of from 5 to 35 μm) in an amount of from about 25% to about 75% (for example, from about 30% to about 70%) by weight, and at least one filler having a needle-like structure (for example wollastonite) in an amount of from about 75% to about 25% (for example, from about 70% to about 30%) by weight, based on the total weight of the at least one particulate non-reinforcing filler.

Advantageously, the at least one particulate non-reinforcing filler may be a combination of one or more grades of talc (selected, for example, from talc grades having an average particle size (D50) in the range of from 5 to 35 μm) and at least one filler having a needle-like structure, for example wollastonite. For example, the at least one particulate non-reinforcing filler may comprise one or more grades of talc (selected, for example, from talc grades having an average particle size (D50) in the range of from 5 to 35 μm) in an amount of from about 25% to about 75% (for example, from about 30% to about 70%) by weight, and wollastonite in an amount of from about 75% to about 25% (for example, from about 70% to about 30%) by weight, based on the total weight of the at least one particulate non-reinforcing filler.

The amount of particulate non-reinforcing filler in the composition according to the present invention is from $(85 \times (\rho F/2.8))$ to $(135 \times (\rho F/2.8))$ parts by weight for each 100 parts by weight of base polymer, wherein $\rho F$ is the mean true density (g/cm$^3$) of the at least one particulate non-reinforcing filler.

In the context of the present invention, it has been found that the content amount of the at least one particulate non-reinforcing filler can vary to some extent depending on the mean true density of the at least one particulate non-reinforcing filler used. Without wishing to be bound by theory, it is believed that this is a consequence of the fact that the volume occupied by the at least one particulate non-reinforcing filler once it has been incorporated in the composition plays an important role in obtaining the desired physical properties of the composition, including the putty-like characteristics of the uncured composition. As such, lower content amounts by weight may be suitable in the case of a comparatively less dense particulate non-reinforcing filler (where a given weight will occupy a comparatively higher volume within the composition), while higher content amounts by weight may be suitable in the case of a comparatively dense particulate non-reinforcing filler (where a given weight will occupy a comparatively smaller volume within the composition).

True density refers to the density of the particles that make up a particulate substance, i.e. it does not include the volume of the spaces between the particles.

In the case where the composition of the present invention includes more than one particulate non-reinforcing filler as the at least one particulate non-reinforcing filler, the mean true density of the combined fillers is used to determine the parts by weight of the at least one particulate non-reinforcing filler to be included in the composition. This can be calculated by dividing the total weight of the combined fillers by the total "true volume", wherein the total true volume can be calculated by taking the weight of each filler and dividing by its true density, and then summing the result for all fillers. Thus, for a combination of x fillers, the mean true density of the combination of fillers is:

$$\left(\sum_{i=1}^{x} m_i\right) / \left(\sum_{i=1}^{x} \left(\frac{m_i}{\rho_i}\right)\right)$$

Wherein, for each filler in the combination of fillers, $m_i$ is the weight of the filler and pi is its true density.

The mean true density of the at least one particulate non-reinforcing filler is preferably from 1.5 to 5 g/cm$^3$, for example 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0 g/cm$^3$. For example, the mean true density of the particulate non-reinforcing filler may be from 2 to 4.5 g/cm$^3$, for example from 2 to 4 g/cm$^3$.

Advantageously, the at least one particulate non-reinforcing filler has a mean true density of from 2 to 4 g/cm$^3$ and is included in the composition of the present invention in an amount of from 85 to 135 parts by weight for each 100 parts by weight of the base polymer, for example from 100 to 125 parts or from 90 to 130 parts, for example 95, 100, 105, 110, 115, 120, 125 or 130 parts by weight for each 100 parts by weight of the base polymer, including all intermediate values.

Preferred compositions according to the present invention comprise from 85 to 135 parts by weight of the at least one particulate non-reinforcing filler for each 100 parts by weight of base polymer, for example from 100 to 125 parts or from 90 to 130 parts, for example 95, 100, 105, 110, 115, 120, 125 or 130 parts by weight for each 100 parts by weight of the base polymer, including all intermediate values.

The composition according to the present invention may additionally comprise at least one tack-reducing additive. The at least one tack-reducing additive is preferably selected from the group consisting of microcellular particulate materials. It may be included in the composition of the present invention in an amount of from 5 to 15 parts by weight for each 100 parts by weight of the base polymer, for example from 7 to 13 parts by weight or from 8 to 12 parts by weight for each 100 parts by weight of the base polymer.

The microcellular particulate material comprises hollow particles, microspheres and/or microballoons. Advantageously, the microcellular particulate material is formed of a glass. Examples of suitable glasses include silicate glasses such as glasses comprising aluminium silicate. Volcanic glasses such as perlite may be a particularly suitable basis for the microcellular particulate material.

The tack-reducing additive, which is preferably a microcellular particulate material, preferably has an average particle size (D50) in the range of from 30 to 50 μm, for example from 35 to 45 μm. The mean true density of the at least one microcellular particulate material may be in the range of from 0.15 to 0.35 g/cm$^3$, for example from 0.20 to 0.30 g/cm$^3$.

The composition according to the present invention may additionally comprise an adhesion promoter. The amount of adhesion promoter may be up to 2 parts by weight for each 100 parts by weight of base polymer, for example from 0.4 to 1.6 parts, for example 0.4, 0.5, 0.6, 0.7, 0.8, 0.9, 1.0, 1.1, 1.2, 1.3, 1.4, 1.5 or 1.6 parts by weight for each 100 parts by weight of base polymer, including all intermediate values.

The compositions according to the present invention advantageously have adhesive properties, even in the absence of an adhesion promoter. Nevertheless, the inclusion of an adhesion promoter advantageously promotes lasting adhesion of the compositions according to the present invention to a wide range of substrates including ceramics, glass, metal, wood, plastics and fabrics. It is an advantageous feature of the present invention that such an adhesion promoter can be included while maintaining low tackiness to human skin when the uncured composition is being hand-moulded.

The adhesion promoter for use in the present invention may be selected from suitable adhesion promoters known to those skilled in the art. For example, the adhesion promoter may be an alkoxysilyl compound having one or more substituents selected from the group consisting of amino groups, an epoxy group, aryl groups, a cyano group and an acryloyl group. Mixtures of more than one adhesion promoter may also be contemplated.

The adhesion promoter for use in the present invention may advantageously be one or more selected from the group of compounds having the following general formula:

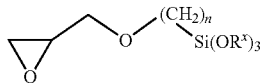

wherein:
n is an integer from 2 to 10; and
$R^x$ is a linear or branched $(C_{1-6})$alkyl group.

Preferred adhesion promoters for use in the composition according to the present invention include those in which n is 3 or 8 and $R^x$ is an ethyl group.

The composition according to the present invention may additionally comprise at least one stabiliser. The at least one stabiliser advantageously acts as a moisture scavenger and thereby improves storage stability. By "moisture scavenger" is meant a material that reacts with moisture and/or traps moisture.

Materials suitable for use as the at least one stabiliser of the present invention include tri-$(C_{2-4})$alkoxy silanes of the type already described herein for use as end-capping reagents (crosslinkers). The description of those tri-$(C_{2-4})$ alkoxy silanes applies mutatis mutandis to the at least one stabiliser of the present invention. In this regard, it is noted that the at least one stabiliser can be the same as the end-capping reagent, or it may be different. In the case where it is the same, then an excess of end-capping reagent (crosslinker) may be used for the end-capping/crosslinking, and the remaining amount may act as a stabiliser; alternatively, an additional amount may be added after end-capping (crosslinking). In the case where it is different, the at least one stabiliser is advantageously added to the composition after end-capping.

Other materials for use as the at least one stabiliser include suitable moisture scavengers known to those skilled in the art, including both organic and inorganic moisture scavengers. Organic moisture scavengers may include those having amido, amino and/or epoxy groups. An example of an organic moisture scavenger is bistrimethylsilyl carbodiimide. As inorganic moisture scavengers, moisture trapping materials such as zeolites may be contemplated.

The composition may contain from 1.5 to 3.5 parts by weight of the at least one stabiliser for each 100 parts of base polymer, for example 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, or 3.5 parts by weight for each 100 parts of base polymer.

The composition according to the present invention may additionally comprise at least one fibrous filler (i.e. a filler composed of fibres). By "fibrous" is meant a material composed of flexible threads or filaments, typically of a natural or synthetic organic polymer. These threads or filaments may be characterised by an average aspect ratio (i.e. ratio of length to diameter) of, for example, greater than 15, preferably greater than 20. The average length of the threads or filaments may be, for example, less than 1 mm (measured by image analysis). For example, the average length of the threads or filaments may be from about 75 µm to about 500 µm.

Various fibrous fillers may be contemplated for use in the present invention, including both natural and synthetic fibrous fillers. As natural fibrous fillers, cotton, wool, silk, bagasse fillers, coconut hull/fibre fillers, sisal/hemp fillers, wood fibre and the like may be contemplated, for example in the form of flock. As synthetic fibrous fillers, polyaramid, polyamide and polyester fibres may be contemplated, for example chopped fibres of one or more of these. Mixtures of one or more natural fibrous fillers and/or one or more synthetic fibrous fillers may be used as the at least one fibrous filler. The one or more fibrous fillers may be surface treated to make them hydrophobic if required. Suitable treatments in this regard include treatment with for example, a dimethyl silicone fluid (i.e. dimethylsiloxane), dichlorodimethylsilane, hexamethyldisilazane or the like. The one or more fibrous fillers may also be subjected to drying before use, if necessary.

When a fibrous filler is included in the compositions according to the present invention, then it may be present in an amount of up to 15 parts, for example up to 13 parts or up to 11 parts, by weight for each 100 parts by weight of base polymer, for example up to 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5 or 15 parts by weight for each 100 parts by weight of base polymer.

Compositions of the present invention including at least one fibrous filler may advantageously exhibit certain modified post-cure characteristics, such as a higher modulus, higher tensile strength, and/or higher tear strength.

The composition of the present invention may include one or more additives selected from the group consisting of colourants (for example dyes and/or pigments, particularly powdered pigments), fragrances, anti-microbial agents, anti-bacterial agents and anti-fungal agents. Other types of additives may also be contemplated in order to impart desired or aesthetic characteristics on the composition of the present invention, as long as they can be accommodated while maintaining the desired properties of the composition.

It has been reported that putty-like characteristics can be achieved in an uncured silicone elastomer composition by incorporating significant quantities of a silicone elastomer powder in the composition. The putty-like characteristics of the uncured composition of the present invention, as well as its advantageous post-cure properties, do not rely on such a silicone elastomer powder. In fact, the inclusion of silicone elastomer powder in a composition according to the present invention is not desirable. As such, the composition according to the present invention preferably does not contain any silicone elastomer powder. To the extent that a small amount of silicone elastomer powder may be included in the composition according to the present invention, its amount should not exceed 10 parts by weight for each 100 parts by weight of base polymer, for example it should not exceed 1, 2, 3, 4, 5, 6, 7, 8, 9 or 10 parts by weight for each 100 parts by weight of base polymer.

Silicone elastomer compositions have been reported wherein a carboxylic acid and/or carboxylic acid anhydride is added as a component of the composition, for example as a curing catalyst or co-catalyst. It will be noted that the curing catalyst of the present invention consists of one or more selected from the group consisting of organic titanates and organic zirconates, and that carboxylic acid and carboxylic acid anhydride co-catalysts are thereby excluded. Preferably, no carboxylic acid or carboxylic acid anhydride is added to the composition of the present invention.

According to a further aspect, the present invention provides a tin-free, room temperature curable silicone elastomer composition, wherein the uncured composition is a putty and comprises the following components:
 a) An end-capped base polymer, wherein the base polymer comprises a polysiloxane or mixture of polysiloxanes and has a viscosity of at least 150,000 mPa·s at 25° C., and wherein the end-capped base polymer comprises terminal di-($C_{2-4}$)alkoxy silyl groups;
 b) 2 to 20 parts by weight of at least one particulate reinforcing filler for each 100 parts by weight of base polymer;
 c) 85 to 135 parts by weight of at least one particulate non-reinforcing filler for each 100 parts by weight of base polymer; and
 d) A curing catalyst consisting of one or more selected from the group consisting of organic titanates and organic zirconates.

The description of the first aspect of the invention applies mutatis mutandis to this further aspect.

According to a further aspect, the present invention provides a tin-free, room temperature curable silicone elastomer composition, wherein the uncured composition is a putty and comprises the following components:
 a) An end-capped base polymer, wherein the base polymer comprises a polysiloxane or mixture of polysiloxanes and has a viscosity of at least 150,000 mPa·s at 25° C., and wherein the end-capped base polymer comprises terminal di-($C_{2-4}$)alkoxy silyl groups;
 b) 2 to 20 parts by weight of at least one particulate reinforcing filler for each 100 parts by weight of base polymer;
 c) 85 to 135 parts by weight of at least one particulate non-reinforcing filler for each 100 parts by weight of base polymer, wherein the at least one particulate non-reinforcing filler comprises from 25% to 75% by weight, based on the total weight of the at least one particulate non-reinforcing filler, of at least one filler having a needle-like structure; and
 d) A curing catalyst consisting of one or more selected from the group consisting of organic titanates and organic zirconates.

The description of the first aspect of the invention applies mutatis mutandis to this further aspect.

Since the composition of the present invention is of the condensation curing type and begins to cure when exposed to moisture, it is advantageously packaged in a sealed packaging that acts as a moisture barrier. Thus, according to a further aspect of the present invention, there is provided a packaged silicone elastomer composition comprising the composition according to the present invention in its uncured state within a sealed packaging, wherein the sealed packaging has a water vapour transmission rate (WVTR) of less than 1 $g/m^2/day$, preferably less than 0.5 $g/m^2/day$, and more preferably less than 0.1 $g/m^2/day$.

According to a further aspect, the present invention provides a method of producing a cured silicone elastomer composition comprising exposing the composition according to the present invention in its uncured state to moisture (e.g. the moisture naturally present in the air). It is an advantageous feature of the present invention that, from the point at which the uncured composition is exposed to moisture (e.g. in the air), the composition remains workable (e.g. hand-mouldable) for a period of up to about 2 hours, for example up to 1.5 hours or up to 1 hour.

According to a further aspect, the present invention provides the silicone elastomer composition according to the present invention in its cured state. The silicone elastomer composition of the present invention in its cured state is resilient and tough. In particular, the cured composition has high tensile strength and elongation at break. The cured compositions are also able to retain excellent adhesion to a wide range of substrates.

The silicone elastomer composition according to the present invention may be prepared in accordance with methods generally known in the field of silicone elastomers. For example, the silicone elastomer composition may be prepared by carrying out the following steps:
 a) End-capping the base polymer by carrying out a reaction between the base polymer and an end-capping reagent. This reaction may be carried out in the presence of a functionalisation catalyst. Suitable functionalisation catalysts include strong bases such as alkali metal hydroxides (such as lithium hydroxide, sodium hydroxide, potassium hydroxide, rubidium hydroxide and caesium hydroxide) and alkali metal silanolates (such as alkali metal trimethylsilanolates, for example sodium trimethylsilanolate and potassium trimethylsilanolate), as well as mixtures of any of these. The functionalisation catalyst may be diluted in a suitable solvent as required before use, for example an alcohol (such as ethanol). Following the end-capping reaction, the functionalisation catalyst can be neutralised using a suitable acidic neutralisation agent;
 b) Combining the end-capped base polymer with the remaining components in a low-moisture, preferably substantially moisture-free, environment and mixing until homogeneous; and
 c) Removing volatile components, e.g. under vacuum.

Those skilled in the art will recognise that the above procedure may be modified in a number of ways. For example, step (c) may be carried out prior to, or during, step (b). Furthermore, the remaining components added in step (b) may be added separately or as pre-prepared mixtures, together or in any suitable order. Moreover, components other than the curing catalyst may be added prior to transferring the mixture to a low-moisture, preferably substantially moisture-free, environment, if desired.

The compositions of the present invention are generally prepared at ambient temperatures, for example at a temperature of from about 15° C. to about 35° C.

After preparation, the compositions of the present invention are stored in a low-moisture, preferably substantially moisture-free environment, until required. For example, they may be packaged in a packaging of the type described above.

The present invention may also be described with reference to the following clauses:

1. A tin-free, room temperature curable silicone elastomer composition, wherein the uncured composition is a putty and comprises the following components:
   a) An end-capped base polymer, wherein the base polymer comprises a polysiloxane or mixture of polysiloxanes and has a viscosity of at least 150,000 mPa·s at 25° C., and wherein the end-capped base polymer comprises terminal di-$(C_{2-4})$alkoxy silyl groups;
   b) 2 to 20 parts by weight of at least one particulate reinforcing filler for each 100 parts by weight of base polymer;
   c) $(85\times(\rho F/2.8))$ to $(135\times(\rho F/2.8))$ parts by weight of at least one particulate non-reinforcing filler for each 100 parts by weight of base polymer, wherein $\rho F$ is the mean true density (g/cm$^3$) of the at least one particulate non-reinforcing filler; and
   d) A curing catalyst consisting of one or more selected from the group consisting of organic titanates and organic zirconates.
2. A composition according to Clause 1, wherein the uncured composition has a Williams plasticity of from 100 to 350 at 25° C.
3. A composition according to Clause 1 or 2, wherein the uncured composition has a Williams plasticity of from 100 to 250 at 25° C.
4. A composition according to any preceding clause, wherein the uncured composition has a Williams plasticity of from 120 to 200 at 25° C.
5. A composition according to any preceding clause, wherein the uncured composition has a Williams plasticity of from 120 to 170 at 25° C.
6. A composition according to any preceding clause, wherein the composition is a one-part silicone elastomer composition.
7. A composition according to any preceding clause, wherein the base polymer comprises one type or more than one type of monomer of the following general formula:

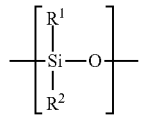

wherein $R^1$ and $R^2$ are independently selected from the group consisting of linear or branched $(C_{1-6})$alkyl groups, linear or branched $(C_{2-6})$alkenyl groups, linear or branched $(C_{2-4})$haloalkyl groups and phenyl groups.
8. A composition according to Clause 7, wherein $R^1$ and $R^2$ are independently selected from the group consisting of linear or branched $(C_{1-6})$alkyl groups and $(C_{2-3})$alkylene-trihalomethyl groups.
9. A composition according to Clause 8, wherein $R^1$ and $R^2$ are independently selected from the group consisting of linear or branched $(C_{1-2})$alkyl groups, $(C_{2-3})$alkylene-trifluoromethyl groups, and $(C_{2-3})$alkylene-trichloromethyl groups.
10. A composition according to Clause 9, wherein $R^1$ and $R^2$ are independently selected from the group consisting of a methyl group, an ethyl group, a 3,3,3-trifluoropropyl group and a 4,4,4-trifluorobutyl group.
11. A composition according to Clause 10, wherein both $R^1$ and $R^2$ are methyl groups.
12. A composition according to any of Clauses 7 to 11, wherein at least 75% of the $R^1$ and $R^2$ groups of the base polymer are methyl groups.
13. A composition according to Clause 12, wherein at least 90% of the $R^1$ and $R^2$ groups of the base polymer are methyl groups.
14. A composition according to Clause 13, wherein all of the $R^1$ and $R^2$ groups of the base polymer are methyl groups.
15. A composition according to any preceding clause, wherein the base polymer comprises a hydroxy-terminated polysiloxane or mixture of hydroxy-terminated polysiloxanes.
16. A composition according to Clause 15, wherein the hydroxy-terminated polysiloxane, or each hydroxy-terminated polysiloxane in the mixture of hydroxy-terminated polysiloxanes, has the following general formula:

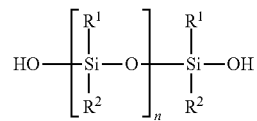

wherein n is selected such that the hydroxy-terminated polysiloxane or mixture of hydroxy-terminated polysiloxanes has a viscosity of at least 150,000 mPa·s at 25° C.
17. A composition according to any preceding clause, wherein the base polymer comprises a hydroxy-terminated polydimethylsiloxane (PDMS) or mixture of hydroxy-terminated polydimethylsiloxanes.
18. A composition according to any preceding clause, wherein the viscosity of the base polymer is from 150,000 to 1,000,000 mPa·s at 25° C.
19. A composition according to Clause 18, wherein the viscosity of the base polymer is from 150,000 to 700,000 mPa·s at 25° C.
20. A composition according to Clause 19, wherein the viscosity of the base polymer is from 250,000 to 600,000 mPa·s at 25° C.
21. A composition according to Clause 20, wherein the viscosity of the base polymer is from 300,000 to 550,000 mPa·s at 25° C.
22. A composition according to Clause 21, wherein the viscosity of the base polymer is from 320,000 to 500,000 mPa·s at 25° C.
23. A composition according to Clause 22, wherein the viscosity of the base polymer is from 350,000 to 500,000 mPa·s at 25° C.
24. A composition according to any preceding clause, wherein the terminal di-$(C_{2-4})$alkoxy silyl groups have the general formula

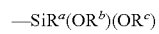

wherein:
   $R^a$ is selected from the group consisting of a linear or branched $(C_{1-10})$alkyl group, a linear or branched $(C_{2-8})$alkenyl group and a $(C_{6-10})$aryl group, each of which groups may be optionally substituted by one or more substituents selected from the group consisting of halogens, a cyano group, an aminyl group, an —NHR$^e$, group, an —NR$^e$R$^f$ group, an —OR$^e$ group, a —C(=O) R$^e$ group, a —C(=O)OR$^e$ group, a carboxyl group, a glycidyl group and a sulfanyl group, wherein each R$^e$ and R$^f$ group is independently selected from the group consisting of linear or branched $(C_{1-6})$alkyl groups; and $R^b$ and $R^c$ are independently selected from the group consisting of $(C_{2-4})$alkyl groups.

25. A composition according to Clause 24, wherein $R^a$ is selected from the group consisting of a linear or branched $(C_{1-6})$alkyl group and a linear or branched $(C_{2-6})$alkenyl group.

26. A composition according to Clause 25, wherein $R^a$ is selected from the group consisting of a $(C_{1-2})$alkyl group or a $(C_{2-3})$alkenyl group.

27. A composition according to Clause 26, wherein $R^a$ is selected from the group consisting of a methyl group and a vinyl group.

28. A composition according to any of Clauses 24 to 27, wherein $R^b$ and $R^c$ are independently selected from the group consisting of ethyl, n-propyl and iso-propyl groups.

29. A composition according to Clause 28, wherein $R^b$ and $R^c$ are ethyl groups.

30. A composition according to any preceding clause, wherein the end-capped base polymer is the reaction product of a hydroxy-terminated polysiloxane or mixture of hydroxy-terminated polysiloxanes and an end-capping reagent comprising a tri-$(C_{2-4})$alkoxy silane.

31. A composition according to Clause 30, wherein the tri-$(C_{2-4})$alkoxy silane has the general formula:

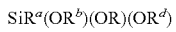

$SiR^a(OR^b)(OR)(OR^d)$ wherein:
$R^a$, $R^b$ and $R^c$ are as defined in any of Clauses 24 to 29; and
$R^d$ is a $(C_{2-4})$alkyl group.

32. A composition according to Clause 31, wherein $R^d$ is selected from the group consisting of ethyl, n-propyl and iso-propyl groups.

33. A composition according to Clause 32, wherein $R^d$ is an ethyl group.

34. A composition according to any of Clauses 30 to 33, wherein the tri-$(C_{2-4})$alkoxy silane is selected from the group consisting of triethoxyvinylsilane, triethoxymethyl silane, and mixtures thereof.

35. A composition according to any preceding clause, wherein the organic titanates and organic zirconates are represented by the following general formula:

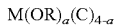

$M(OR)_a(C)_{4-a}$ wherein:
M is Ti or Zr;
each R may be the same or different and represents a linear or branched $(C_{1-12})$alkyl group;
each C may be the same or different and represents a ligand having the following general formula:

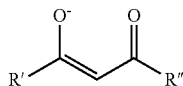

wherein R' and R" are independently selected from the group consisting of a linear or branched $(C_{1-6})$alkyl group and a linear or branched $(C_{1-6})$alkoxy group; and
a is an integer from 0 to 4.

36. A composition according to Clause 35, wherein M is Ti.
37. A composition according to Clause 35 or 36, wherein each R may be the same or different and represents a linear or branched $(C_{3-10})$alkyl group.
38. A composition according to Clause 37, wherein each R may be the same or different and represents a linear or branched $(C_{3-8})$alkyl group.

39. A composition according to Clause 38, wherein each R may be the same or different and represents an isobutyl, isopropyl or 2-ethyl hexyl group.

40. A composition according to any of Clauses 35 to 39, wherein R' and R" are independently selected from the group consisting of a linear or branched $(C_{1-3})$alkyl group and a linear or branched $(C_{1-3})$alkoxy group.

41. A composition according to Clause 40, wherein R' and R" are independently selected from the group consisting of a methyl group, an ethyl group, a methoxy group and an ethoxy group.

42. A composition according to Clause 41, wherein R' and R" are independently selected from the group consisting of a methyl group and an ethoxy group.

43. A composition according to any of Clauses 35 to 39, wherein R' is a linear or branched $(C_{1-3})$alkyl group and R" is a linear or branched $(C_{1-3})$alkoxy group.

44. A composition according to Clause 43, wherein R' is a methyl or ethyl group and R" is a methoxy or ethoxy group.

45. A composition according to any of Clauses 35 to 44, wherein a is 0, 2 or 4.

46. A composition according to Clause 45, wherein a is 2.

47. A composition according to any preceding clause, wherein the curing catalyst consists of one or more selected from the group consisting of diisobutoxy-bis(ethylacetoacetato)titanate, titanium diisobutoxide bis(acetylacetonate), titanium diisopropoxide bis(acetylacetonate), titanium diisopropoxide bis(ethylacetoacetate) and zirconium dibutoxide bis(acetylacetonate).

48. A composition according to any preceding clause, wherein the at least one particulate reinforcing filler has a B.E.T. surface area of at least 60 m²/g.

49. A composition according to Clause 48, wherein the at least one particulate reinforcing filler has a B.E.T. surface area of from 60 m²/g to 450 m²/g.

50. A composition according to Clause 49, wherein the at least one particulate reinforcing filler has a B.E.T. surface area of from 80 m²/g to 150 m²/g.

51. A composition according to any preceding clause, wherein the at least one particulate reinforcing filler is selected from the group consisting of fumed silica, fumed alumina, carbon black, precipitated silica, precipitated calcium carbonate, cobalt dioxide, titanium dioxide and mixtures thereof.

52. A composition according to Clause 51, wherein the at least one particulate reinforcing filler is fumed silica.

53. A composition according to Clause 52, wherein the at least one particulate reinforcing filler is hydrophobic fumed silica.

54. A composition according to any preceding clause, wherein the at least one particulate non-reinforcing filler has a B.E.T. surface area of less than 40 m²/g.

55. A composition according to any preceding clause, wherein the at least one particulate non-reinforcing filler has an average particle size (D50) of at least 5 µm.

56. A composition according to any preceding clause, wherein the at least one particulate non-reinforcing filler has an average particle size (D50) of from 5 µm to 35 µm.

57. A composition according to any preceding clause, wherein the at least one particulate non-reinforcing filler is selected from the group consisting of talc, calcium carbonate, calcium silicate, mica, barium sulfate, precipitated silica, and mixtures thereof.

58. A composition according to any preceding clause, wherein the at least one particulate non-reinforcing filler comprises one or more grades of talc.

59. A composition according to Clause 58, wherein the one or more grades of talc are selected from the group consisting of talc grades having an average particle size (D50) in the range of from 5 to 35 μm.
60. A composition according to any of Clauses 1 to 54, wherein the at least one particulate non-reinforcing filler comprises at least one filler having a needle-like structure.
61. A composition according to Clause 60, wherein the at least one filler having a needle-like structure has an average particle length (L50) of at least 5 μm.
62. A composition according to Clause 61, wherein the at least one filler having a needle-like structure has an average particle length (L50) of from 5 μm to 90 μm.
63. A composition according to Clause 62, wherein the at least one filler having a needle-like structure has an average particle length (L50) of from 10 μm to 30 μm.
64. A composition according to any of Clauses 60 to 63, wherein the mean aspect ratio of the at least one filler having a needle-like structure is at least 3.
65. A composition according to Clause 64, wherein the mean aspect ratio of the at least one filler having a needle-like structure is from 3 to 30.
66. A composition according to Clause 65, wherein the mean aspect ratio of the at least one filler having a needle-like structure is from 3 to 20.
67. A composition according to any of Clauses 60 to 66, wherein the at least one filler having a needle like structure is an inorganic mineral filler.
68. A composition according to Clause 67, wherein the at least one filler having a needle like structure is selected from wollastonite, aluminium borate, and mixtures thereof.
69. A composition according to Clause 68, wherein the at least one filler having a needle like structure comprises wollastonite.
70. A composition according to any of Clauses 60 to 69, wherein the at least one filler having a needle-like structure is present in an amount of from 25% to 75% by weight based on the total weight of the at least one particulate non-reinforcing filler.
71. A composition according to Clause 70, wherein the at least one filler having a needle-like structure is present in an amount of from 30% to 70% by weight based on the total weight of the at least one particulate non-reinforcing filler.
72. A composition according to any of Clauses 60 to 71, wherein the at least one particulate non-reinforcing filler is a combination of at least one granular non-reinforcing filler having an average particle size (D50) of at least 5 μm and at least one filler having a needle-like structure.
73. A composition according to Clause 72, wherein the at least one particulate non-reinforcing filler is a combination of at least one particulate non-reinforcing filler selected from the group consisting of talc, calcium carbonate, calcium silicate, mica, barium sulfate, precipitated silica, and mixtures thereof and at least one filler having a needle-like structure.
74. A composition according to Clause 73, wherein the at least one particulate non-reinforcing filler is a combination of one or more grades of talc and at least one filler having a needle-like structure.
75. A composition according to any of Clauses 70 to 74, wherein the at least one filler having a needle-like structure is wollastonite.
76. A composition according to any preceding clause, wherein the composition additionally comprises at least one tack reducing additive selected from the group consisting of microcellular particulate materials.
77. A composition according to Clause 76, wherein the at least one tack-reducing additive is included in the composition is an amount of from 5 to 15 parts by weight for each 100 parts by weight of the base polymer.
78. A composition according to Clause 76 or 77, wherein the microcellular particulate material comprises hollow particles, microspheres and/or microballoons of a glass.
79. A composition according to any of Clauses 76 to 78, wherein the at least tack reducing additive has an average particle size (D50) in the range of from 30 to 50 μm.
80. A composition according to any of Clauses 76 to 79, wherein the at least one tack reducing additive has a mean true density in the range of from 0.15 to 0.35 g/cm$^3$. 81. A composition according to any preceding clause, wherein the composition comprises from 10 to 20 parts by weight of the at least one particulate reinforcing filler for each 100 parts by weight of base polymer.
82. A composition according to Clause 81, wherein the composition comprises from
12 to 18 parts by weight of the at least one particulate reinforcing filler for each 100 parts by weight of base polymer.
83. A composition according to any preceding clause, wherein the mean true density of the at least one particulate non-reinforcing filler is from 1.5 to 5 g/cm$^3$.
84. A composition according to any preceding clause, wherein the composition comprises from 85 to 135 parts by weight of the at least one particulate non-reinforcing filler for each 100 parts by weight of base polymer.
85. A composition according to Clause 84, wherein the composition comprises from 100 to 125 parts by weight of the at least one particulate non-reinforcing filler for each 100 parts by weight of base polymer.
86. A composition according to any preceding clause, wherein the composition additionally comprises an adhesion promoter.
87. A composition according to Clause 86, wherein the composition comprises up to 2 parts by weight of adhesion promoter for each 100 parts by weight of base polymer.
88. A composition according to Clause 86 or 87, wherein the adhesion promoter is one or more selected from the group of compounds having the following general formula:

$$\underset{O}{\triangle}\!\!-\!\!O\!\!-\!\!(CH_2)_n\!\!-\!\!Si(OR^x)_3$$

wherein:
n is an integer from 2 to 10; and
$R^x$ is a linear or branched $(C_{1-6})$alkyl group.
89. A composition according to Clause 88, wherein n is 3 or 8 and $R^x$ is an ethyl group.
90. A composition according to any preceding clause, wherein the composition further comprises at least one stabiliser.
91. A composition according to Clause 90, wherein the at least one stabiliser is a tri-$(C_{2-4})$alkoxy silane according to any of Clauses 31-34.
92. A composition according to Clause 90 or 91, wherein the composition comprises from 1.5 to 3.5 parts by weight of the at least one stabiliser for each 100 parts by weight of base polymer.

93. A composition according to any preceding clause, wherein the composition further comprises at least one fibrous filler.
94. A composition according to Clause 93, wherein the at least one fibrous filler is composed of threads or filaments having an average aspect ratio of greater than 10 and an average length of less than 1 mm.
95. A composition according to Clause 94, wherein the average length of the threads or filaments is from 75 μm to 500 μm.
96. A composition according to any of Clauses 93 to 95, wherein the at last one fibrous filler is selected from the group consisting of natural and synthetic organic polymers.
97. A composition according to any of Clauses 93 to 96, wherein the at least one fibrous filler comprises chopped fibres of one or more selected from the group consisting of natural and synthetic organic polymers.
98. A composition according to any of Clauses 93 to 97, wherein the composition comprises up to 15 parts by weight of the at least one fibrous filler for each 100 parts by weight of base polymer.
99. A composition according to Clause 98, wherein the composition comprises up to
13 parts by weight of the at least one fibrous filler for each 100 parts by weight of base polymer
100. A composition according to Clause 99, wherein the composition comprises up to 11 parts by weight of the at least one fibrous filler for each 100 parts by weight of base polymer.
101. A composition according to any preceding clause, further comprising one or more additives selected from the group consisting of colourants, fragrances, anti-microbial agents, anti-bacterial agents and anti-fungal agents.
102. A composition according to any preceding clause, wherein the composition comprises less than 10 parts by weight of silicone elastomer powder for each 100 parts by weight of base polymer.
103. A composition according to Clause 102, wherein the composition does not contain any silicone elastomer powder.
104. A composition according to any preceding clause, wherein no carboxylic acid or carboxylic acid anhydride is added to the composition.
105. A silicone elastomer composition comprising the composition according to any preceding clause in its cured state.
106. A packaged silicone elastomer composition comprising the composition according to any of Clauses 1 to 104 in its uncured state within a sealed packaging, wherein the sealed packaging has a water vapour transmission rate (WVTR) of less than 0.1 g/m²/day.
107. A method of producing a cured silicone elastomer composition comprising exposing the composition according to any of Clauses 1 to 104 in its uncured state to moisture.

The invention will now be illustrated by means of the following examples, it being understood that these are intended to explain the invention, and in no way to limit its scope.

EXAMPLES

Compositions were prepared according to the following Examples:

Example 1

100 parts by weight of a hydroxy-terminated polydimethylsiloxane having a viscosity of 400 000 mPa·s at 25° C. was functionalised with 2.45 parts vinyltriethoxysilane to give an end-capped polysiloxane having terminal vinyldiethoxysilyl groups. This was mixed with 15.5 parts poly(dimethylsiloxane)-treated fumed silica (Cabosil™ TS720), 82.7 parts of a first grade of talc (Magsil™ D200), 26.1 parts of a second grade of talc (Magsil™ 2628c), 10.8 parts Sil-Cell™ 35/34, 1.03 parts 3-glycidyloxypropyltriethoxysilane (GLYEO), 1.94 parts diisobutoxy-bisethylacetoacetatotitanate, 2.45 parts methyltriethoxysilane (MTES) and 0.52 parts red HTV pigment (Holcosil™) to produce a coloured putty-like product Sample 1.

Example 2

100 parts by weight of a hydroxy-terminated polydimethylsiloxane having a viscosity of 400 000 mPa·s at 25° C. was functionalised with 3.67 parts methyltriethoxysilane to give an end-capped polysiloxane having terminal methyldiethoxysilyl groups. This was mixed with 15.7 parts poly(dimethylsiloxane)-treated fumed silica (Cabosil™ TS720), 83.7 parts of a first grade of talc (Magsil™ D200), 26.4 parts of a second grade of talc (Magsil™ 2628c), 10.9 parts Sil-Cell™ 35/34, 1.00 parts 3-glycidyloxypropyltriethoxysilane (GLYEO), 1.96 parts diisobutoxy-bisethylacetoacetatotitanate, and 0.52 parts red HTV pigment (Holcosil™) to produce a coloured putty-like product Sample 2.

Example 3

100 parts by weight of a hydroxy-terminated polydimethylsiloxane having a viscosity of 400 000 mPa·s at 25° C. was functionalised with 3.67 parts methyltriethoxysilane to give an end-capped polysiloxane having terminal methyldiethoxysilyl groups. This was mixed with 15.7 parts poly(dimethylsiloxane)-treated fumed silica (Cabosil™ TS720), 83.7 parts of a first grade of talc (Magsil™ D200), 26.4 parts of a second grade of talc (Magsil™ 2628c), 10.9 parts Sil-Cell™ 35/34, 1.00 parts 3-glycidyloxypropyltriethoxysilane (GLYEO), 1.96 parts diisobutoxy-bisethylacetoacetatotitanate, 2.45 parts methyltriethoxysilane (MTES) and 0.52 parts red HTV pigment (Holcosil™) to produce a coloured putty-like product Sample 3.

Example 4

100 parts by weight of a hydroxy-terminated polydimethylsiloxane having a viscosity of 400 000 mPa·s at 25° C. was functionalised with 2.45 parts vinyltriethoxysilane to give an end-capped polysiloxane having terminal vinyldiethoxysilyl groups. This was mixed with 15.5 parts poly(dimethylsiloxane)-treated fumed silica (Cabosil™ TS720), 82.7 parts of a first grade of talc (Magsil™ D200), 26.1 parts of a second grade of talc (Magsil™ 2628c), 10.8 parts Sil-Cell™ 35/34, 1.03 parts 3-glycidyloxypropyltriethoxysilane (GLYEO), 1.94 parts diisobutoxy-bisethylacetoacetatotitanate, and 0.52 parts red HTV pigment (Holcosil™) to produce a coloured putty-like product Sample 4.

Example 5

100 parts by weight of a hydroxy-terminated polydimethylsiloxane having a viscosity of 400 000 mPa·s at 25° C. was functionalised with 2.44 parts vinyltriethoxysilane to give an end-capped polysiloxane having terminal vinyldiethoxysilyl groups. This was mixed with 15.5 parts poly(dimethylsiloxane)-treated fumed silica (Cabosil™ TS720), 84.8 parts of a first grade of talc (Magsil™ D200), 26.1 parts of a second grade of talc (Magsil™ 2628c), 10.8 parts Sil-Cell 35/34, 1.03 parts 3-glycidyloxypropyltriethoxysilane (GLYEO), 1.94 parts diisopropoxy-bisethylacetoacetatotitanate, and 0.52 parts red HTV pigment (Holcosil™) to produce a coloured putty-like product Sample 5.

Example 6

100 parts by weight of a hydroxy-terminated polydimethylsiloxane having a viscosity of 400 000 mPa·s at 25° C. was functionalised with 2.45 parts vinyltriethoxysilane to give an end-capped polysiloxane having terminal vinyldiethoxysilyl groups. This was mixed with 15.69 parts poly(dimethylsiloxane)-treated fumed silica (Cabosil™ TS720), 80.82 parts of a first grade of talc (Magsil™ D200), 14.69 parts of a second grade of talc (Magsil™ 2628c), 10.92 parts Sil-Cell™ 35/34, 4.90 parts of cotton fibres (ECD60 Ecru milled cotton flock supplied by Goonvean fibres; max. micron size 250), 1.05 parts 3-glycidyloxypropyltriethoxysilane (GLYEO), 1.96 parts diisobutoxy-bisethylacetoacetatotitanate, 2.45 parts methyltriethoxysilane (MTES) and 0.52 parts black HTV pigment (Holcosil™) to produce a coloured putty-like product Sample 6.

Example 7

100 parts by weight of a hydroxy-terminated polydimethylsiloxane having a viscosity of 400 000 mPa·s at 25° C. was functionalised with 2.45 parts vinyltriethoxysilane to give an end-capped polysiloxane having terminal vinyldiethoxysilyl groups. This was mixed with 15.69 parts poly(dimethylsiloxane)-treated fumed silica (Cabosil™ TS720), 57.19 parts of talc (Magsil™ D200), 10.95 parts Sil-Cell™ 35/34, 49.02 parts of TREMIN™ 939-600 wollastonite filler, 1.05 parts 3-glycidyloxypropyltriethoxysilane (GLYEO), 1.96 parts diisobutoxy-bisethylacetoacetatotitanate, 2.46 parts methyltriethoxysilane (MTES) and 0.52 parts black HTV pigment (Holcosil™) to produce a coloured putty-like product Sample 7.

Example 8

100 parts by weight of a hydroxy-terminated polydimethylsiloxane having a viscosity of 400 000 mPa·s at 25° C. was functionalised with 2.45 parts vinyltriethoxysilane to give an end-capped polysiloxane having terminal vinyldiethoxysilyl groups. This was mixed with 15.67 parts poly(dimethylsiloxane)-treated fumed silica (Cabosil™ TS720), 80.82 parts of a first grade of talc (Magsil™ D200), 14.69 parts of a second grade of talc (Magsil™ 2628c), 10.94 parts Sil-Cell™ 35/34, 16.49 parts of ROTOCELL PLUS™ (0.04 to 0.09 mm grain size) pumice filler, 1.05 parts 3-glycidyloxypropyltriethoxysilane (GLYEO), 1.96 parts diisobutoxy-bisethylacetoacetatotitanate, 2.47 parts methyltriethoxysilane (MTES) and 0.52 parts black HTV pigment (Holcosil™) to produce a coloured putty-like product Sample 8.

Example 9

100 parts by weight of a hydroxy-terminated polydimethylsiloxane having a viscosity of 400 000 mPa·s at 25° C. was functionalised with 2.45 parts vinyltriethoxysilane to give an end-capped polysiloxane having terminal vinyldiethoxysilyl groups. This was mixed with 15.67 parts poly(dimethylsiloxane)-treated fumed silica (Cabosil™ TS720), 40.82 parts of talc (Magsil™ D200), 10.94 parts Sil-Cell™ 35/34, 65.31 parts of TREMIN™ 939-600 wollastonite filler, 1.05 parts 3-glycidyloxypropyltriethoxysilane (GLYEO), 1.96 parts diisobutoxy-bisethylacetoacetatotitanate, 2.45 parts methyltriethoxysilane (MTES) and 1.22 parts red HTV pigment (Holcosil™) to produce a coloured putty-like product Sample 9.

Example 10

100 parts by weight of a hydroxy-terminated polydimethylsiloxane having a viscosity of 400 000 mPa·s at 25° C. was functionalised with 2.45 parts vinyltriethoxysilane to give an end-capped polysiloxane having terminal vinyldiethoxysilyl groups. This was mixed with 15.67 parts poly(dimethylsiloxane)-treated fumed silica (Cabosil™ TS720), 40.82 parts of talc (Magsil™ D200), 10.94 parts Sil-Cell™ 35/34, 65.31 parts of TREMIN™ 939-010 wollastonite filler, 1.05 parts 3-glycidyloxypropyltriethoxysilane (GLYEO), 1.96 parts diisobutoxy-bisethylacetoacetatotitanate, 2.45 parts methyltriethoxysilane (MTES), 0.26 parts black HTV pigment and 0.26 parts white HTV pigment (Holcosil™) to produce a coloured putty-like product Sample 10.

Comparative Example 11

100 parts by weight of a hydroxy-terminated polydimethylsiloxane having a viscosity of 400 000 mPa·s at 25° C. was functionalised with 2.45 parts vinyltrimethoxysilane to give an end-capped polysiloxane having terminal vinyldimethoxysilyl groups. This was mixed with 15.5 parts poly(dimethylsiloxane)-treated fumed silica (Cabosil™ TS720), 82.7 parts of a first grade of talc (Magsil™ D200), 26.1 parts of a second grade of talc (Magsil™ 2628c), 10.8 parts Sil-Cell™ 35/34, 1.03 parts 3-glycidyloxypropyltriethoxysilane (GLYEO), 1.94 parts diisobutoxy-bisethylacetoacetatotitanate, 2.45 parts methyltriethoxysilane (MTES) and 0.52 parts red HTV pigment (Holcosil™) to produce a coloured putty-like product Sample 11.

Test Methods:

The following test methods were carried out:

Tensile Test:

The tensile test was carried out as follows on samples cured for 24 hours at 25° C. and 50% relative humidity (HR):

Test pieces (1 cm×7 cm pieces cut from cured 2 mm thick sheets of the material) were stretched using a universal testing machine (UTM) at a constant velocity of crosshead of the driven grip. Readings of tensile strength and elongation were taken as required during the stretching of the test piece until it broke.

Williams Plasticity:

Williams Plasticity is a commonly used parameter (described in various standards including ASTM-D926, ISO-7323 and JIS-K6249) for the characterisation of materials which are too viscous for a reliable viscosity measurement (i.e. they do not flow without applied force). The method used to determine Williams Plasticity was to take 2 cm$^3$ of material, formed into a cylinder of 10 mm in height, and to place this between the parallel plates on a Williams Plastometer instrument. 49 N of force (5 kgf) was then applied to the top plate to deform the sample for 90 seconds. The final gap between the plates was measured in mm to the nearest 0.01 mm and this value was multiplied by 100 to give a 'plasticity number' of between 1 and 1000. This test was carried out at a temperature of 23±2° C.

Highly Accelerated Life Test (HALT)—Stability:

In order to compare the stability of compositions, a highly accelerated ageing test was performed in which samples were stored at high temperature (70° C.) for approximately 15 days. Plasticity measurements were taken every day.

Results and Discussion:

Samples 1-10 of Examples 1-10 and Sample 11 of Comparative Example 11 were subjected to the Test Methods described above. The commercial product Sugru® (version including methyltris(methylethylketoxime)silane; available from FormFormForm Limited) was also subjected to the Test Methods described above as Sample 12. The results are shown in Table 1 and in FIGS. 1 and 2.

TABLE 1

|  | Examples: (Sample Number) | | | | | | | | | | Comparative Examples: (Sample Number) | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Working time | >30 min | >30 min | >30 min | >30 min | >30 min | >30 min | >30 min | >30 min | >30 min | >30 min | >30 min | >30 min |
| Cure time (hours) | 24 h | 24 h | 24 h | 24 h | 24 h | 24 h | 24 h | 24 h | 24 h | 24 h | >24 h | 24 h |
| Williams Plasticity | 149 | 173 | 175 | 173 | 184 | 206 | 170 | 196 | 179 | 159 | 168 | 180 |
| Tensile Strength (MPa) (24 h cure) | 2.29 | 2.11 | 2.31 | 2.17 | 2.09 | 2.85 | 3.15 | 2.11 | 3.33 | 3.14 | 1.69 | 2.2 |
| Young's Modulus (MPa) | 5.19 | 4.94 | 5.32 | 4.59 | 4.74 | 7.23 | 7.23 | 6.35 | 7.30 | 10.26 | 4.55 | 5.5 |
| Elongation at break (%) | 199 | 211 | 184 | 224 | 228 | 249 | 274 | 212 | 268 | 161 | 158 | 155 |
| Qualitative uncured material | All samples were smooth putties, easy to mould | | | | | | | | | | | |

It can be seen from the results that Sample 11 (Comparative; prepared using vinyltrimethoxysilane as an end-capping agent) had a longer cure time, lower tensile strength, and lower elongation at break than Samples 1-10 of the present invention.

Figure 2:
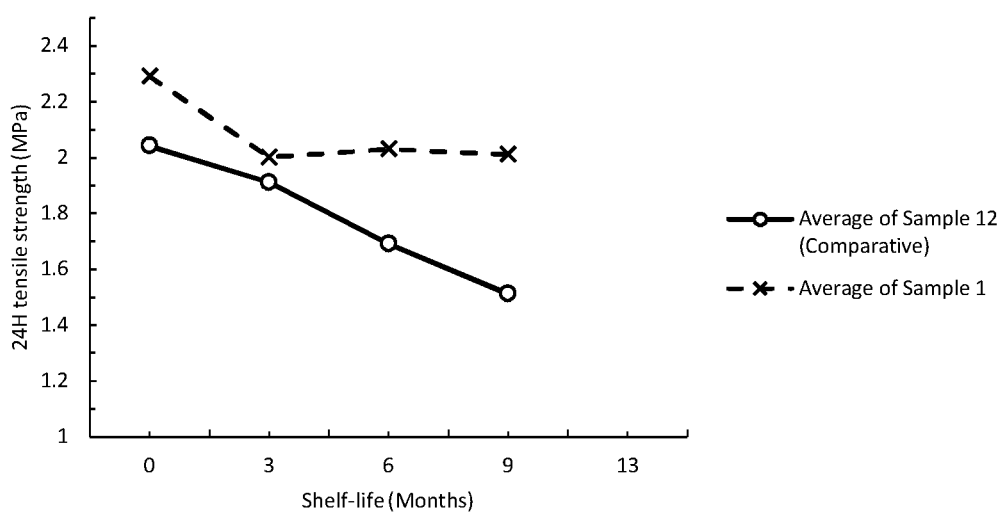
FIG. 2 shows the results of tensile strength tests conducted for fresh and aged Sample 1 (of Example 1) and Sample 12 (Comparative).

It can also be seen from the results that Sample 12 (Comparative; the commercial product Sugru®) had a lower elongation at break than Samples 1-10 of the present invention. It also displayed less favourable aging properties, as shown in FIGS. 1 and 2.

The invention claimed is:

1. A tin-free, room temperature curable silicone elastomer composition, wherein the uncured composition is a putty and comprises the following components:
   a) an end-capped base polymer, wherein the base polymer comprises a polysiloxane or mixture of polysiloxanes and has a viscosity of at least 150,000 mPa·s at 25° C., and wherein the end-capped base polymer comprises terminal di-($C_{2-4}$)alkoxy silyl groups;
   b) 2 to 20 parts by weight of at least one particulate reinforcing filler for each 100 parts by weight of base polymer;
   c) $(85 \times (\rho F/2.8))$ to $(135 \times (\rho F/2.8))$ parts by weight of at least one particulate non-reinforcing filler per 100 parts by weight of base polymer, wherein $\rho F$ is the mean true density (g/cm$^3$) of the at least one particulate non-reinforcing filler; and
   d) a curing catalyst consisting of one or more selected from the group consisting of: organic titanates and organic zirconates,
   and wherein the composition does not contain any silicone elastomer powder.

2. The composition according to claim 1, wherein the uncured composition has a Williams plasticity of from 100 to 350 when measured at 25° C.

3. The composition according to claim 1, wherein the composition is a one-part silicone elastomer composition.

4. The composition according to claim 1, wherein the base polymer comprises one type or more than one type of monomer of the following general formula:

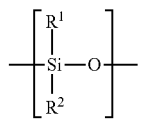

wherein $R^1$ and $R^2$ are independently selected from the group consisting of: linear or branched ($C_{1-6}$)alkyl groups, linear or branched ($C_{2-6}$)alkenyl groups, linear or branched ($C_{2-4}$)haloalkyl groups, and phenyl groups.

5. The composition according to claim 1, wherein the base polymer comprises a hydroxy-terminated polysiloxane or mixture of hydroxy-terminated polysiloxanes.

6. The composition according claim 1, wherein the terminal di-($C_{2-4}$)alkoxy silyl groups have the general formula —SiR$^a$(OR$^b$)(OR$^c$)

wherein:

$R^a$ is selected from the group consisting of: a linear or branched ($C_{1-10}$)alkyl group, a linear or branched ($C_{2-8}$)alkenyl group and a ($C_{6-10}$)aryl group, each of which groups may be optionally substituted by one or more substituents selected from the group consisting of halogens, a cyano group, an aminyl group, an —NHR$^c$, group, an —NR$^c$R$^f$ group, an —OR$^c$ group, a —C(=O)R$^c$ group, a —C(=O)OR$^c$ group, a carboxyl group, a glycidyl group and a sulfanyl group, wherein each R$^c$ and R$^f$ group is independently selected from the group consisting of: linear or branched ($C_{1-6}$)alkyl groups; and wherein $R^b$ and $R^c$ are independently selected from the group consisting of ($C_{2-4}$)alkyl groups.

7. The composition according to claim 6, wherein $R^a$ is selected from the group consisting of: a methyl group and a vinyl group.

8. The composition according to claim 6, wherein $R^b$ and $R^c$ are independently selected from the group consisting of: ethyl, n-propyl and iso-propyl groups.

9. The composition according to claim 1, wherein the end-capped base polymer is the reaction product of a hydroxy-terminated polysiloxane or mixture of hydroxy-terminated polysiloxanes and an end-capping reagent comprising a tri-(C2-4)alkoxy silane.

10. The composition according to claim 9, wherein the tri-$(C_{2-4})$alkoxy silane has the general formula:

$$SiR^a(OR^b)(OR^c)(OR^d)$$

wherein:

$R^a$ is selected from the group consisting of: a linear or branched $(C_{1-10})$alkyl group, a linear or branched $(C_{2-8})$alkenyl group and a $(C_{6-10})$aryl group, each of which groups may be optionally substituted by one or more substituents selected from the group consisting of halogens, a cyano group, an aminyl group, an —$NHR^e$ group, an —$NR^eR^f$ group, an —$OR^e$ group, a —$C(=O)R^e$ group, a —$C(=O)OR^e$ group, a carboxyl group, a glycidyl group and a sulfanyl group, wherein each $R^e$ and $R^f$ group is independently selected from the group consisting of: linear or branched $(C_{1-6})$alkyl groups; and wherein $R^b$ and $R^c$ are independently selected from the group consisting of $(C_{2-4})$alkyl groups; and, $R^d$ is a $(C_{2-4})$alkyl group.

11. The composition according to claim 1, wherein the organic titanates and organic zirconates are represented by the following general formula:

$$M(OR)_a(C)_{4-a}$$

wherein:

M is Ti or Zr;

each R may be the same or different and represents a linear or branched $(C_{1-12})$alkyl group;

each C may be the same or different and represents a ligand having the following general formula:

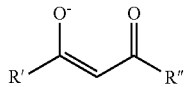

wherein R' and R" are independently selected from the group consisting of a linear or branched $(C_{1-6})$alkyl group and a linear or branched $(C_{1-6})$alkoxy group; and a is an integer from 0 to 4.

12. The composition according to claim 1, wherein the composition additionally comprises an adhesion promoter which is one or more selected from the group of compounds having the following general formula:

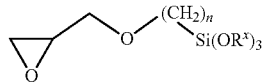

wherein:

n is an integer from 2 to 10; and $R^x$ is a linear or branched $(C_{1-6})$alkyl group.

13. The composition according to claim 1, wherein the composition additionally comprises at least one fibrous filler.

14. A silicone elastomer composition comprising a composition according to claim 1 in its cured state.

15. A packaged silicone elastomer composition comprising the composition according to claim 1 in its uncured state within a sealed packaging, wherein the sealed packaging has a water vapour transmission rate (WVTR) of less than 0.1 g/m²/day.

16. A method of producing a cured silicone elastomer composition comprising exposing the composition according to claim 1 in its uncured state to moisture.

* * * * *